US006884745B2

(12) United States Patent
Yazici et al.

(10) Patent No.: US 6,884,745 B2
(45) Date of Patent: Apr. 26, 2005

(54) PERFORATED CYLINDRICAL FUEL CELLS

(75) Inventors: Mehmet Suha Yazici, Parma Heights, OH (US); Robert Angelo Mercuri, Seven Hills, OH (US); Robert Anderson Reynolds, III, Bay Village, OH (US); Paul Calarco, Westlake, OH (US)

(73) Assignee: Advanced Energy Technology Inc., Wilmington, DE (US)

( * ) Notice: Subject to any disclaimer, the term of this patent is extended or adjusted under 35 U.S.C. 154(b) by 204 days.

(21) Appl. No.: 10/184,817

(22) Filed: Jun. 28, 2002

(65) Prior Publication Data
US 2004/0001986 A1 Jan. 1, 2004

(51) Int. Cl.[7] .......................... H01M 4/88; H01M 4/96; B05D 5/12
(52) U.S. Cl. .................. 502/101; 427/115; 429/31; 429/42; 429/44
(58) Field of Search ............... 429/30, 31, 32, 429/33, 40, 42, 44; 502/101; 427/115

(56) References Cited

U.S. PATENT DOCUMENTS

| | | | |
|---|---|---|---|
| 3,404,061 A | 10/1968 | Shane et al. ............... 161/125 |
| 4,895,713 A | 1/1990 | Greinke et al. ............ 423/448 |
| 4,988,583 A | 1/1991 | Watkins et al. ............. 429/30 |
| 5,300,370 A | 4/1994 | Washington et al. ........ 429/34 |
| 5,458,989 A | 10/1995 | Dodge ........................ 429/31 |
| 5,509,942 A | 4/1996 | Dodge ..................... 29/623.2 |
| 5,882,570 A | 3/1999 | Hayward ............... 264/328.18 |
| 5,902,762 A | 5/1999 | Mercuri et al. .............. 501/99 |
| 5,989,300 A | 11/1999 | Eshraghi ................. 429/623.1 |
| 6,001,500 A | 12/1999 | Bass et al. ................... 429/31 |
| 6,007,932 A * | 12/1999 | Steyn ........................ 429/31 |
| 6,030,718 A | 2/2000 | Fuglevand et al. ........... 429/26 |
| 6,060,188 A | 5/2000 | Muthuswamy et al. ....... 429/31 |
| 6,063,517 A | 5/2000 | Montemayor et al. ........ 429/31 |
| 6,080,501 A | 6/2000 | Kelley et al. ................ 429/31 |
| 6,096,449 A | 8/2000 | Fuglevand et al. ........... 429/13 |
| 6,127,061 A | 10/2000 | Shun et al. .................. 429/40 |
| 6,217,800 B1 | 4/2001 | Hayward ................... 264/29.1 |
| 6,218,035 B1 | 4/2001 | Fuglevand et al. ........... 429/30 |
| 6,326,097 B1 | 12/2001 | Hockaday .................... 429/34 |
| 6,365,292 B1 | 4/2002 | Faris et al. .................. 429/27 |
| 6,383,556 B2 | 5/2002 | Lott et al. .................. 427/115 |
| 6,387,556 B1 | 5/2002 | Fuglevand et al. ........... 429/22 |
| 6,413,671 B1 | 7/2002 | Mercuri et al. .......... 429/231.8 |
| 6,428,918 B1 | 8/2002 | Fuglevand et al. ........... 429/13 |
| 6,506,511 B1 | 1/2003 | Lakeman et al. ............. 429/31 |
| 2001/0044373 A1 | 11/2001 | Lott et al. |
| 2001/0050234 A1 | 12/2001 | Shiepe |
| 2002/0164518 A1 | 11/2002 | Wilkinson et al. |
| 2003/0012986 A1 | 1/2003 | Koschany |

FOREIGN PATENT DOCUMENTS

| WO | 9516287 | 6/1995 | ............ H01M/8/02 |
|---|---|---|---|
| WO | 0054953 | 9/2000 | ............ B29C/45/00 |

* cited by examiner

Primary Examiner—Stephen J. Kalafut
(74) Attorney, Agent, or Firm—Waddey & Patterson P.C.; James R. Cartiglia

(57) ABSTRACT

The invention relates to tubular fuel cells and methods of making such fuel cells. The inventive fuel cells include at least one fluid permeable structure having a plurality of perforations or channels. The perforations allow fluids, e.g., hydrogen or oxygen, to flow through the structure. The inventive methods include forming at least one perforated structure and forming the perforated structure into a tubular fuel cell or at least a potential component of a tubular fuel cell.

18 Claims, 11 Drawing Sheets

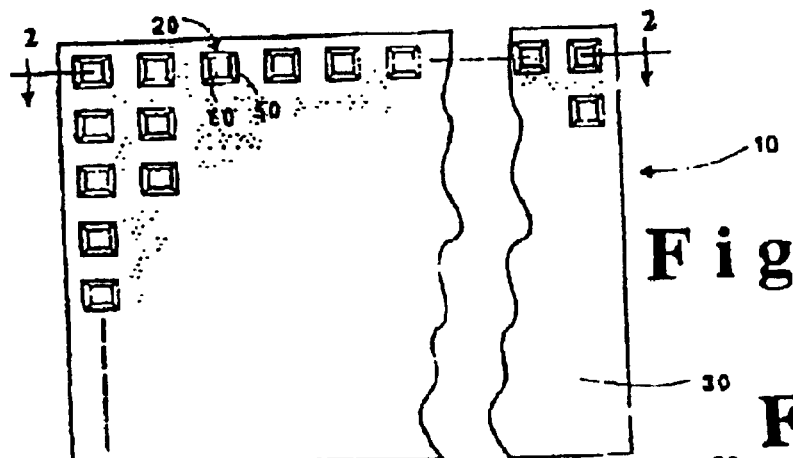
Fig. 1
Fig. 1(A)
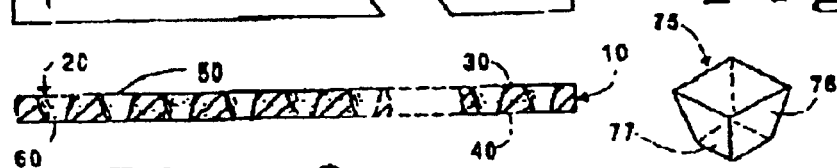
Fig. 2  Fig. 2(A)
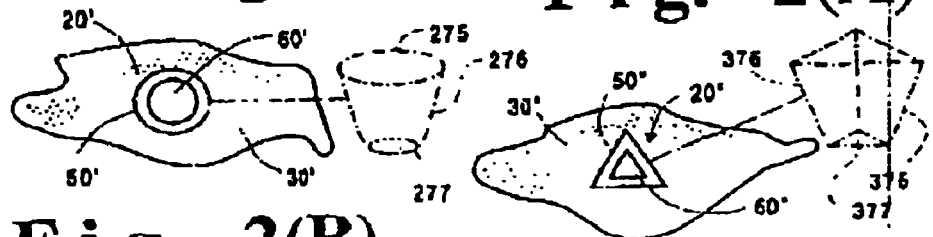
Fig. 2(B)  Fig. 2(C)
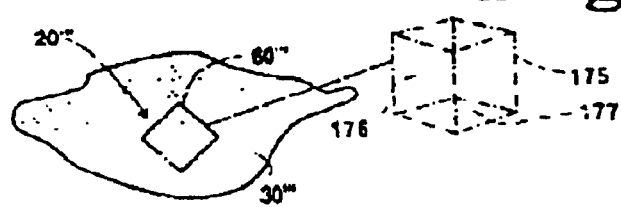

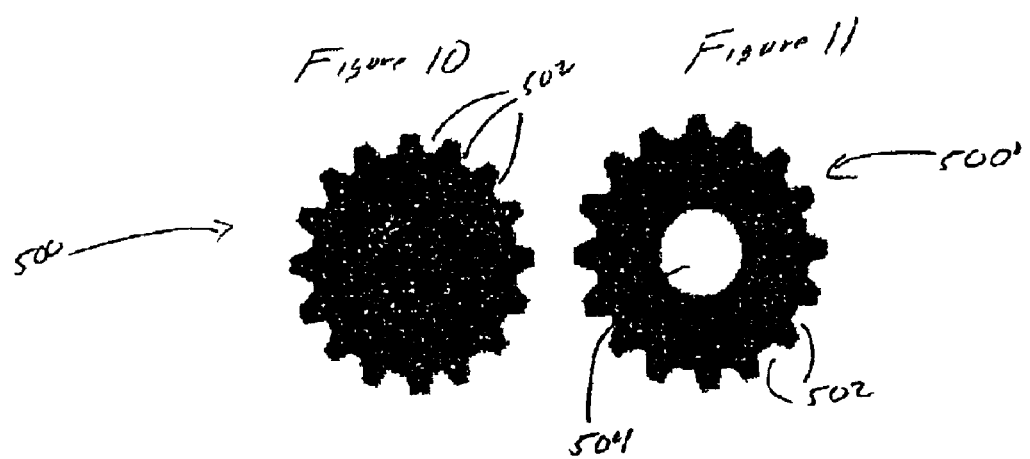

PERFORATED CYLINDRICAL FUEL CELLS

FIELD OF THE INVENTION

This invention relates to tubular shaped fuel cells, which are fluid permeable in the radial direction and methods of making the tubular fuel cells.

BACKGROUND OF THE INVENTION

An ion exchange membrane fuel cell, more specifically a proton exchange membrane (PEM) fuel cell, produces electricity through the chemical reaction of hydrogen and oxygen in the air. Within the fuel cell, electrodes, denoted as anode and cathode, surround a polymer electrolyte to form what is generally referred to as a membrane electrode assembly, or MEA. Oftentimes, the electrodes also function as the gas diffusion layer (or GDL) of the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell includes a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen is removed. Combinations of such fuel cells are used in a fuel cell stack to provide the desired voltage.

The flow field plates have a continuous reactant flow channel with an inlet and an outlet. The inlet is connected to a source of fuel in the case of an anode flow field plate, or a source of oxidant in the case of a cathode flow field plate. When assembled in a fuel cell stack, each flow field plate functions as a current collector.

Electrodes, also sometimes referred to as gas diffusion layers, may be formed by providing a graphite sheet as described herein and providing the sheet with channels, which are preferably smooth-sided, and which pass between the parallel, opposed surfaces of the flexible graphite sheet and are separated by walls of compressed expandable graphite. It is the walls of the flexible graphite sheet that actually abut the ion exchange membrane, when the inventive flexible graphite sheet functions as an electrode in an electrochemical fuel cell.

The channels are formed in the flexible graphite sheet at a plurality of locations by mechanical impact. Thus, a pattern of channels is formed in the flexible graphite sheet. That pattern can be devised in order to control, optimize or maximize fluid flow through the channels, as desired. For instance, the pattern formed in the flexible graphite sheet can comprise selective placement of the channels, as described, or it can comprise variations in channel density or channel shape in order to, for instance, equalize fluid pressure along the surface of the electrode when in use, as well as for other purposes which would be apparent to the skilled artisan.

The impact force is preferably delivered using a patterned roller, suitably controlled to provide well-formed perforations in the graphite sheet. In the course of impacting the flexible graphite sheet to form channels, graphite is displaced within the sheet to disrupt and deform the parallel orientation of the expanded graphite particles. In effect the displaced graphite is being "die-molded" by the sides of adjacent protrusions and the smooth surface of the roller. This can reduce the anisotropy in the flexible graphite sheet and thus increase the electrical and thermal conductivity of the sheet in the direction transverse to the opposed surfaces. A similar effect is achieved with frusto-conical and parallel-sided peg-shaped flat-ended protrusions.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been greatly expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, foils, mats or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles and graphite layers substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.04 g/cc to about 2.0 g/cc. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal and electrical properties of the sheet are very different, by orders of magnitude, for the "c" and "a" directions.

Methods of manufacturing articles from graphite particles have been proposed. For example, U.S. Pat. No. 5,882,570 to Hayward discloses a method of grinding flexible unimpregnated graphite foil to a small particle size, thermally shocking the particles to expand them, mixing the expanded graphite with a thermoset phenolic resin, injection molding the mixture to form low density blocks or other shapes, then heat treating the blocks to thermoset the material. The resulting blocks may be used as insulating material in a furnace or the like.

WO 00/54953 and U.S. Pat. No. 6,217,800, both to Hayward further describe processes related to those of U.S. Pat. No. 5,882,570.

The Hayward processes are very limited in the scope of the source materials they use, and the type of end products they can produce. Hayward uses only unimpregnated graphite source materials, and his finished products are only formed by mixing the graphite particles with large proportions of resin and injection molding the mixture to form articles which are then thermoset.

Accordingly, there is a continuing need in the art for improved processes for producing flexible graphite sheets or products from various types of graphite materials, including those which are already resin impregnated, and for manufacture of more broadly useful products from those materials. Such improved processes are provided by the present invention.

There is also a need for various shaped fuel cells for different types of applications. One such application is a power source for portable devices such as, but not limited to, cameras, portable radios, portable stereos, portable televisions, and cellular telephones. Many of these types of devices can use tubular shaped fuel cells. The invention addresses the aforementioned need for fuel cells for portable devices.

SUMMARY OF THE INVENTION

One aspect of the invention is a fuel cell. The fuel cell comprises an electrolyte and a catalyst layer in communication with the electrolyte. The cell further comprises a fluid permeable structure. The fluid permeable structure includes a plurality of perforations. The structure has at least a first major surface in communication with the catalyst. Preferably, the fuel cell has a tubular shape.

Another aspect of the invention is a method of making the fuel cell. The method includes the step of perforating at least a portion of the fluid permeable structure. The perforated structure is rolled into a tubular shape. A catalyst layer and an electrolyte are applied a major surface (e.g., the aforementioned first major surface) of the tubular structure. Preferably the structure communicates with the catalyst and the catalyst communicates with the electrolyte.

A further aspect of the invention is another method of making the inventive fuel cell. The inventive method comprises the step of perforating at least a portion of the fluid permeable structure. The method further includes laminating a catalyst and an electrolyte to a major surface (e.g., the aforementioned first major surface) of the structure to form a combination of elements of at least the structure, catalyst, and electrolyte and rolling the combination of elements into a tubular shape.

An additional aspect of the invention is a membrane electrode assembly. The assembly comprises an electrode and an ion exchange membrane in communication with the electrode. Preferably, the electrode comprises a sheet of a compressed mass of expanded graphite particles. The sheet has a plurality of transverse fluid channels passing through the sheet between first and second parallel opposed surfaces. Each channel comprises openings at both the first and second surfaces. Also the assembly assumes a tubular.

In accordance with an embodiment of the present invention, a graphite article is provided comprising a compressed mass of expanded graphite particles in the form of a sheet having parallel, opposed first and second surfaces. The sheet has a plurality of transverse fluid channels passing through the sheet between the parallel, opposed first and second surfaces. Optionally the channels may be formed by mechanically impacting a surface of the sheet to displace graphite within the sheet at a plurality of predetermined locations to provide the channels with openings at the first and second parallel opposed surfaces. In a preferred embodiment, the channel openings at one of the parallel opposed surfaces are smaller than their respective openings at the other opposed surface whereby fluid on the side of the opposed surface having the smaller channel openings enters the respective channels at an initial velocity which is greater than the velocity of the fluid exiting the respective channels, i.e., the gas exit velocity is slowed. The article of the present invention is useful as a fluid permeable electrode in electrochemical fuel cells as hereinafter described.

An advantage of the invention is that the invention may be practiced to produce fuel cells for portable devices. The invention may also be practiced to produce tubular shaped fuel cells for non-portable devices.

Additional features and advantages of the invention will be set forth in the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 1 is a plan view of a transversely permeable sheet of flexible graphite having transverse channels in accordance with the present invention.

FIG. 1(A) shows a flat-ended protrusion element used in making the channels in the perforated sheet of FIG. 1.

FIG. 2 is a side elevation view in section of the sheet of FIG. 1.

FIGS. 2(A), (B), (C) show various suitable flat-ended configurations for transverse channels in accordance with the present invention.

FIGS. 10 and 11 are end-views of two different embodiments of a fluid distribution element.

DETAILED DESCRIPTION OF THE INVENTION

Figure 3:
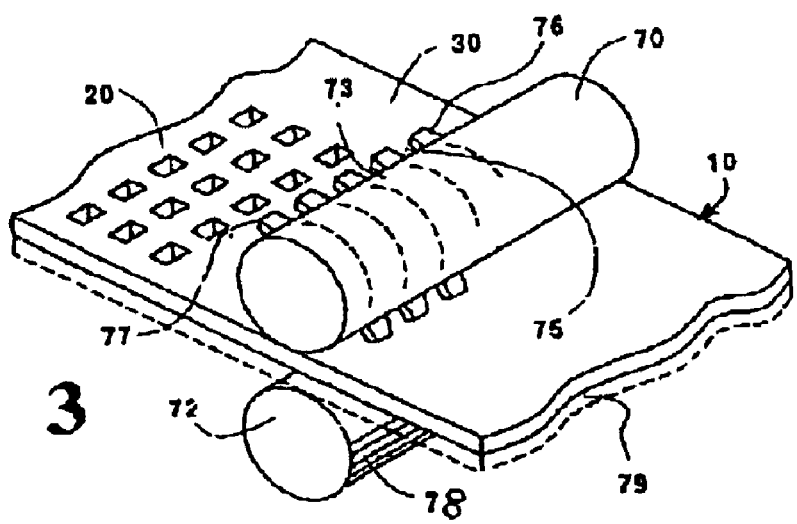
FIGS. 3, 3(A) shows a mechanism for making the article of FIG. 1.

Graphite is a crystalline form of carbon comprising atoms covalently bonded in flat layered planes with weaker bonds between the planes. By treating particles of graphite, such as natural graphite flake, with an intercalant of, e.g.,. a solution of sulfuric and nitric acid, the crystal structure of the graphite reacts to form a compound of graphite and the intercalant. The treated particles of graphite are hereafter referred to as "particles of intercalated graphite". Upon exposure to high temperature, the particles of intercalated graphite expand in dimension as much as 80 or more times its original volume in an accordion-like fashion in the "c" direction, i.e., in the direction perpendicular to the crystalline planes of the graphite. The exfoliated graphite particles are vermiform in appearance, and are therefore commonly referred to as worms. The worms may be compressed together into flexible sheets, which, unlike the original graphite flakes, can be formed and cut into various shapes and provided with small transverse openings by deforming mechanical impact.

Graphite starting materials for the flexible sheets suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials for the flexible sheets used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than twenty weight percent. More preferably, the graphite employed for the present invention will have a purity of at least about 94%. In the most preferred embodiment, the graphite employed will have a purity of at least about 99%.

A common method for manufacturing graphite sheet, e.g., foil from flexible graphite, is described by Shane et al. in U.S. Pat. No. 3,404,061 the disclosure of which is incorporated herein by reference. In the typical practice of the Shane et al. method, natural graphite flakes are intercalated by dispersing the flakes in a solution containing an oxidizing agent of, e.g., a mixture of nitric and sulfuric acid, advantageously at a level of about 20 to about 300 parts by weight of intercalant solution per 100 parts by weight of graphite flakes (pph). The intercalation solution may contain at least one oxidizing agent and one or more intercalating agents. Examples of intercalation solutions include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g., trifluoroacetic acid, and a strong oxidizing agent soluble in the organic acid. Alternatively, an electric potential can be used to bring about oxidation of graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, e.g., nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated, any excess solution is drained from the flakes and the flakes are water-washed. The washed particles of intercalated graphite are sometimes referred to as "residue compounds." The quantity of intercalation solution retained on the flakes after draining may range from about 20 to about 150 parts of solution by weight per about 100 parts by weight of graphite flakes (pph) and more typically about 50 to about 120 pph. Alternatively, the quantity of the intercalation solution may be limited to between about 10 to about 50 parts of solution per hundred parts of graphite by weight (pph) which permits the washing step to be eliminated as taught and described in U.S. Pat. No. 4,895,713 the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1,10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one-half hour or less, e.g., on the order of 10 to 25 minutes, can be employed at the higher temperatures.

Upon exposure to high temperature, e.g., temperatures of at least about 160° C. and especially about 700° C. to about 1200° C. or higher, the particles of intercalated graphite expand as much as 80 to 1000 or more times its original volume in an accordion-like fashion in the c-direction, i.e., in the direction perpendicular to the crystalline planes of the constituent graphite particles. The expanded, i.e., exfoliated graphite particles are vermiform in appearance, and are therefore commonly referred to as worms. The worms may be compressed together into flexible sheets, which, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g., by roll-pressing, to a thickness of about 0.003 to about 0.15 inch and a density of about 0.1 to about 1.5 grams per cubic centimeter. From about 1.5–30% by weight of ceramic additives, can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of 0.15 to 1.5 millimeters. The width of the particles is suitably from about 0.04 to about 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness, of the flexible graphite sheet as well as "fixing" the morphology of the sheet. Suitable resin content is preferably at least about 5% to about 90% by weight, more preferably about 10 to 35% by weight, and suitably up to about 60% by weight. Resins found especially useful in the practice of the present invention include acrylic-, epoxy- and phenolic-based resin systems, polytetrafluoroethylene, polyvinyldifluoride, or mixtures thereof. Suitable epoxy resin systems include those based on diglycidyl ether or bisphenol A (DGEBA) and other multifunctional resin systems; phenolic resins that can be employed include resole and novolac phenolics. Other suitable types of resins include polytetrafluoroethylene, and polyvinyldifluoride.

Nonetheless, the graphite sheet as prepared above is cut and trimmed to form the desired articles. The methods of the present invention may use the above-described graphite sheets including the trimmed portions. More specifically, the process of the present invention may use the above-described graphite sheets including the trimmed portions at various stages of completeness, as discussed below.

With reference to FIG. 1 and FIG. 2, a compressed mass of expanded graphite particles, in the form of a flexible graphite sheet is shown at 10. The flexible graphite sheet 10 is provided with channels 20 (also referred to herein as perforations), which are preferably smooth-sided as indicated at 67 in FIGS. 5 and 6, and which pass between the parallel, opposed surfaces 30, 40 of flexible graphite sheet 10. The channels 20 preferably have openings 50 on one of the opposed surfaces 30 which are larger than the openings 60 in the other opposed surface 40. In one embodiment, opening 50 on surface 30 has a larger cross sectional area that the cross sectional area of opening 60 on surface 40. In another embodiment, the ratio of the cross sectional areas of opening 50 to opening 60 comprises from about 1:1 to up to about 150:1. Examples of suitable ratios include about 5:1, about 10:1, about 50:1, about 75:1, and about 100:1. It is preferred that channel 20 runs obliquely from opening 60 to opening 50. In another embodiment, opening 50 may have a square cross section and opening 60 may have a circular cross section or vice versa.

In an alternate embodiment, the openings 50 and 60 are the same size. In another alternate embodiment, not shown, channel 20 may run acutely from opening 60 to opening 50. In this embodiment, opening 60 would be larger than opening 50. A typical dimension of channel 20 is at least about 100 $\mu$m in diameter or width. Thus it is preferred that the opening 60, if rectangular, has a cross sectional area of at least about 0.01 mm$^2$. In the case that opening 60 is circular, the preferred cross sectional area is at least about 0.0075 mm$^2$. Preferably the fluid permeability of sheet 10 is at least about 1 $\mu$l/cm$^2$-s, more preferably at least about 100 ml/cm$^2$-s. The transverse fluid permeability of channeled flexible graphite sheet samples, in accordance with the present invention, may be measured, using a Gurley Model 4118 for Fluid Permeability Measurement.

The channels 20 can have different configurations as shown at 20'–20'' in FIGS. 2(A), 2(B), 2(C) which are formed using flat-ended protrusion elements of different shapes as shown at 75, 175, 275, 375 in FIGS. 1(A) and 2(A), 2(B), 2(C), suitably formed of metal, e.g., steel and integral with and extending from the pressing roller 70 of the impacting device shown in FIG. 3. The smooth flat-ends of the protrusion elements, shown at 77, 177, 277, 377, and the smooth bearing surface 73, of roller 70, and the smooth bearing surface 78 of roller 72 (or alternatively flat metal plate 79), ensure deformation and substantially complete displacement of graphite within the flexible graphite sheet, i.e., preferably, there are no rough or ragged edges or debris resulting from the channel-forming impact. Preferred protrusion elements have decreasing cross-section in the direction away from the pressing roller 70 to provide larger channel openings on the side of the sheet, which is initially impacted. The development of smooth, unobstructed surfaces 63 surrounding channel openings 60, enables the free flow of fluid into and through smooth-sided (at 67) channels 20. In a preferred embodiment, openings one of the opposed surfaces are larger than the channel openings in the other opposed surface, e.g., from 1 to 200 times greater in area, and result from the use of protrusion elements having converging sides such as shown at 76, 276, 376.

Figure 3A:
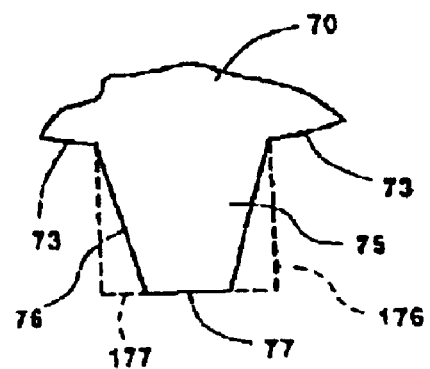
Figure 4:
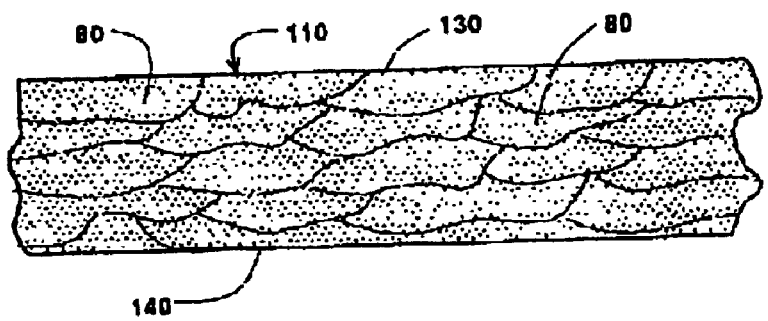
FIG. 4 shows an enlarged sketch of an elevation view of the oriented expanded graphite particles of prior art flexible graphite sheet material.
Figure 5:
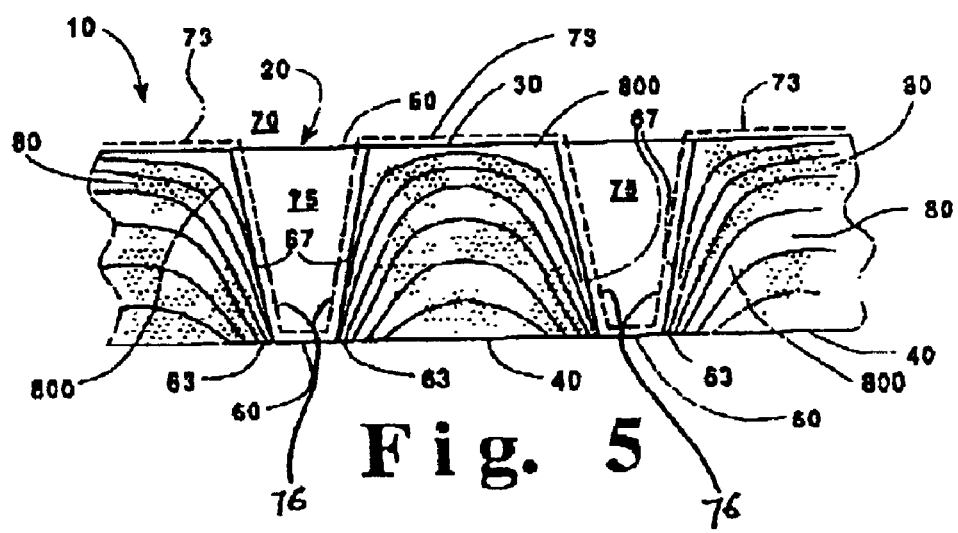
FIG. 5 is a sketch of an enlarged elevation view of an article formed of flexible graphite sheet in accordance with the present invention.

One way that the channels 20 are formed in the flexible graphite sheet 10 at a plurality of pre-determined locations by mechanical impact at the predetermined locations in sheet 10 is by using a mechanism such as shown in FIG. 3. The mechanisms comprises a pair of steel rollers 70, 72 with one of the rollers having truncated, i.e. flat-ended, prism-shaped protrusions 75, illustrated in FIG.3(A), which impact surface 30 of flexible graphite sheet 10 to displace graphite and penetrate sheet 10 to form open channels 20. In practice, both rollers 70, 72 can be provided with "out-of-register" protrusions, and a flat metal plate indicated at 79, can be used in place of smooth-surfaced roller 72. With respect to protrusions 75 on roller 70, the spacing between the protrusions may be uniform or non-uniform and, consequently, channels 20 on sheet 10 may be aligned uniformly or non-uniformly to each other. FIG. 4 is an enlarged sketch of a sheet of flexible graphite 110, which shows a typical orientation of compressed expanded graphite particles 80 substantially parallel to the opposed surfaces 130, 140. This orientation of the expanded graphite particles 80 results in anisotropic properties in flexible graphite sheets; i.e., the electrical conductivity and thermal conductivity of the sheet being substantially lower in the direction transverse to opposed surfaces 130, 140 ("c" direction) than in the direction ("a" direction) parallel to opposed surfaces 130, 140. In the course of impacting flexible graphite sheet 10 to form channels 20, as illustrated in FIG. 3, graphite is displaced within flexible graphite sheet 10 by flat-ended (at 77) protrusions 75 to push aside graphite as it travels to and bears against smooth surface 73 of roller 70 to disrupt and deform the parallel orientation of expanded graphite particles 80 as shown at 800 in FIG. 5. This region of 800, adjacent channels 20, shows disruption of the parallel orientation into an oblique, non-parallel orientation is optically observable at magnifications of 100× and higher. In effect the displaced graphite is being "die-molded" by the sides 76 of adjacent protrusions 75 and the smooth surface 73 of roller 70 as illustrated in FIG. 5. This reduces the anisotropy in flexible graphite sheet 10 and thus increases the electrical and thermal conductivity of sheet 10 in the direction transverse to the opposed surfaces 30, 40. A similar effect is achieved with frusto-conical and parallel-sided peg-shaped flat-ended protrusions 275 and 175. With respect to FIG. 3 and smooth surface 63 surrounding channel 20, in one embodiment, surface 63 is the surface that is in contact with surface 78 of roller 72 during the forming of the channels 20.

Figure 6:
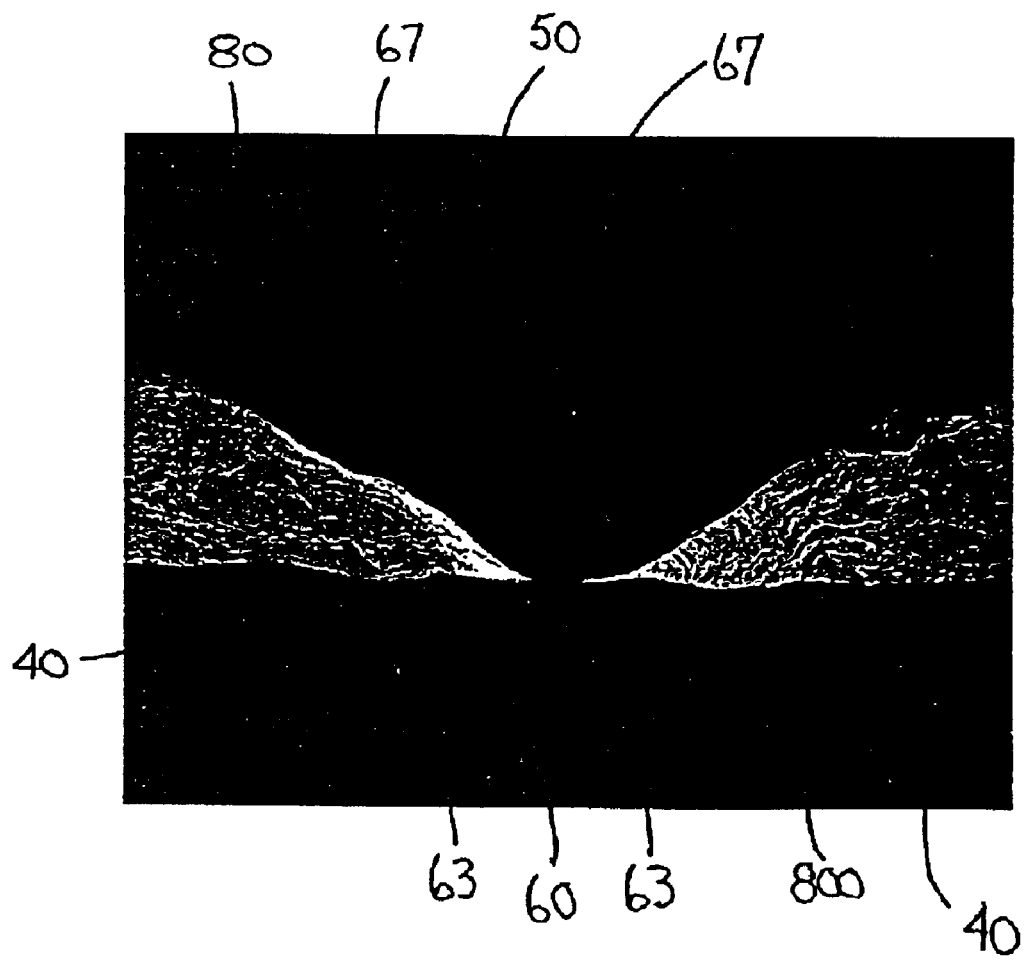
FIG. 6 is a photograph at 100× (original magnification) corresponding to a portion of the side elevation view sketch of FIG. 5.

FIG. 6 is a photograph (original magnification 100×) of a body of flexible graphite corresponding to a portion of the sketch of FIG. 5. The articles of FIGS. 1 and 5 and the material shown in the photograph (100×) of FIG. 6 can be shown to have increased thermal and electrical conductivity in the direction transverse to opposed parallel, planar surfaces 30, 40 as compared to the thermal and electrical conductivity in the direction transverse to surfaces 130, 140 of prior art material of FIG. 4 in which particles of expanded natural graphite unaligned with the opposed planar surfaces are not optically detectable.

In the present invention, for a flexible graphite sheet having a thickness of about 0.003 inch to about 0.015 inch adjacent the channels and a density of about 0.5 to about 1.5 grams per cubic centimeter, a preferred channel density is from about 1000 to about 3000 channels per square inch and the preferred channel size is a channel in which the ratio of the area of larger channel opening to the smaller is from about 50:1 to about 150:1.

With respect to the channel density a maximum range for the channel density may comprises about 50 to about 5000 channels per square inch, more preferably about 500 to about 4000, and most preferably about 1000 to about 2000 channels per square inch. Preferably, enough channels are present to reduce the overall density of sheet 10 by about 5% to about 40%, more preferably about 10% to about 30%, and most preferably about 15% to about 25%.

Sheet 10 of FIG. 1 is one example of a fluid permeable structure suitable for practicing the invention. Sheet 10 has first and second major surfaces 30, 40. Channels 20 of sheet 10 increase the porosity of sheet 10 to greater than the inherent porosity of sheet 10 in an unperforated (non-channeled) state.

Sheet 10 is disclosed to comprise of flexible graphite. Instead of flexible graphite, sheet 10 may be composed of stainless steel, titanium, carbon, or graphite. The graphite may comprise natural or synthetic graphite. In another embodiment, sheet 10 may comprise a composite. One example of a suitable composite of sheet 10 may include flexible graphite and at least one of the group consisting of metal wire, metal shavings, metal foam, polymer foam, molded synthetic graphite, metal-alloy, and combinations thereof Examples of suitable metals include stainless steel, nickel, and titanium. Other suitable types of composites are a graphite-polymer composite or a carbon-graphite composite.

Optionally, either surface 30 or 40 of sheet 10 may have a coating thereon. Suitable coatings include a carbon coating, a graphite coating, a carbon-graphite composite coating, a polyvinyldifluoride coating. Alternatively, any one of the above mentioned coatings might also comprise a sulfonated polyfluoroaliphatic hydrogel (such as NAFION®), polytetrafluoroethylene (such as Teflon®), or another hydrophobic material (e.g., a hydrophobic surfactant). In the case of incorporating a coated sheet 10 into a fuel cell, preferably the coated surface faces one surface of the electrolyte.

Figure 13A:
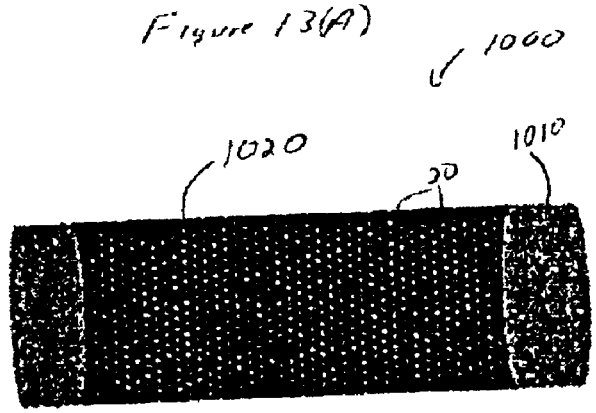
FIGS. 13 and 13(A) are an embodiment of a fluid permeable structure in accordance with one embodiment of the invention.
Figure 13:
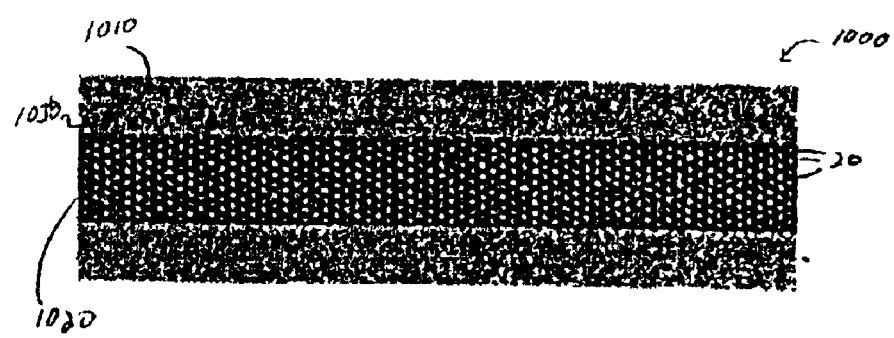

In a further alternate embodiment, sheet 10 may comprise an unperforated perimeter region, as shown in FIG. 13, generally designated 1000. Sheet 1000 has a perforated region 1020 which includes a plurality of perforations (channels) 20 and unperforated region 1010. Preferably, unperforated region 1010 comprises a perimeter of sheet 1000. Region 1010 may also be known as a region substantially devoid of channels. It is also preferred that unperforated region 1010 comprises less than about 25% of the cross sectional area of a first major surface 1030 of sheet 1000, more preferably less than about 20%, even more preferably less than about 15%, and most preferably less than about 10%. Optionally, unperforated region 1010 may comprise a minimum amount of area of first major surface 1030 of sheet 1000 of at least about 1% of the cross sectional area of first major surface 1030, more preferably at least about 3%, and even more preferably at least about 5%. Depicted in FIG. 13(A) is sheet 1000 in a tubular shape. In the use of sheet 1000 in a fuel cell, it is preferred that perforated region 1020 is in communication with the catalyst layer of the fuel cell, preferably direct communication. It is further preferred that the catalyst is not aligned with unperforated region 1010 of sheet 1000. The unperforated region 1010 may act as a seal. Practicing the invention with unperforated region 1010 may result in the advantage of avoiding the need for a gasket, e.g., plastic gasket or silicon gasket, between the structure 1000 and an adjacent component of a fuel cell.

Figure 12:
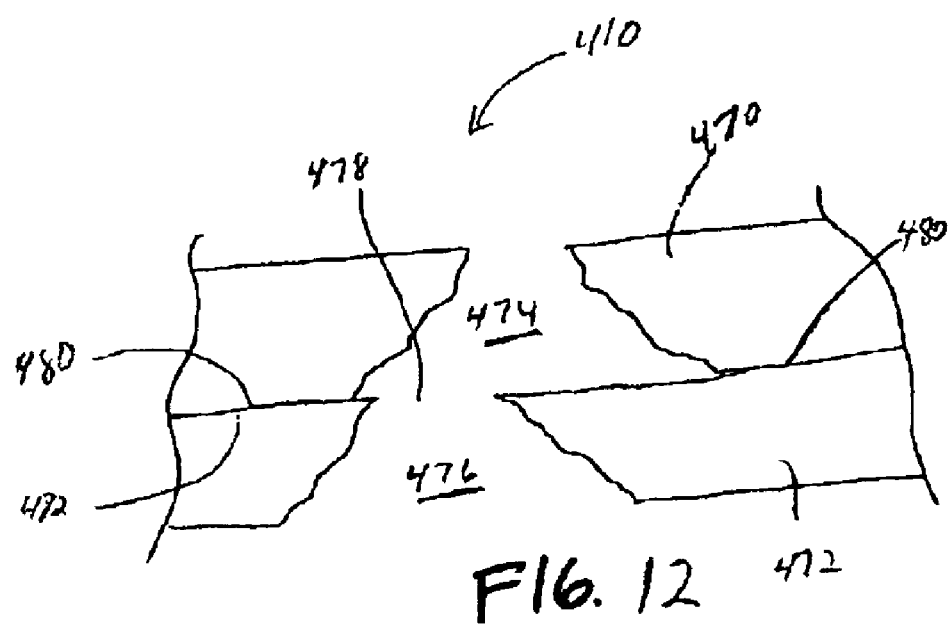
FIG. 12 is a partial schematic view of two layers of flexible graphite, which are being used to form the perforated structure in accordance with the invention.

Furthermore, sheet 10 may comprise more than one layer of material. For example, sheet 10 may be constructed from two or more layers of flexible graphite, as shown in FIG. 12, and generally designated, 410. FIG. 12 schematically illustrates the relationship between two or more layers of flexible graphite to form sheet 410. Depicted in FIG. 12 are two adjacent layers of flexible graphite 470 and 472. Preferably a first major surface 480 of layer 470 is in contact with a second major surface 482 of layer 472. In the case that sheet 410 is formed of more than about 2 layers of flexible graphite, it is preferred that the layers are arranged such that the larger opening of the perforation of a layer abuts against the smaller opening of the perforation of the adjacent layer. In terms of major surfaces, the first major surface of a prior layer is aligned adjacent a second major surface of a subsequent layer.

Each layer 470, 472 can also include at least one perforation, 474 or 476, preferably a plurality of perforations. It is preferred that perforations 474 and 476 are in communication, represented by opening 478. Communication is used herein to refer to the ability of the fluid to flow between openings 474 and 476 of layers 470, 472. Preferably, perforations 474 and 476 share some minimum amount of alignment to form a common opening such as opening 478. Of course, maximizing the alignment between the adjacent openings of perforations 474 and 476 is more preferred.

A fuel cell can be constructed to be generally formed in the shape of a tube or a cylinder. A central core of the cell may serve to distribute one of the fuel or the oxidant throughout the fuel cell. An inner fluid permeable structure is situated coaxially around the central core, and may have a catalyst layer on the outer surface of the central core. This combination of the central core and the catalyst would form an electrode (anode or cathode). A solid polymer electrolyte is situated coaxially around the electrode and, preferably, in intimate contact with the catalyst layer. Optionally, a second electrode is situated coaxially around the electrolyte. The second electrode includes a second layer of catalyst material and a second fluid permeable structure. Preferably, the catalyst of the electrode(s) is situated adjacent the electrolyte. A fuel or oxidant chamber is situated coaxially around and in intimate contact with the second electrode and arranged to distribute the fuel or the oxidant to the second electrode. In an embodiment in which the fuel is distributed through the central core and oxidant is passed through the outer chamber, the inner electrode is the anode and the outer electrode is the cathode. When the fuel and oxidant chambers are reversed, the inner electrode is the cathode and the outer electrode is the anode.

Optionally, the fuel cell may include a gas diffusion layer ("GDL") between the catalyst and the structure (sheet 10), of the electrode. Examples of suitable materials for the GDL comprise flexible graphite or carbon fiber paper. The GDL may also include a coating of any one of the following: carbon particles, graphite particles, graphite powders, carbon powders, polytetrafluoroethylene, a sulfonated polyfluoroaliphatic hydrogel (e.g., NAFION®), polyvinyldifluoride, and combinations thereof. The fuel cell may also include a flow fluid plate in fluid communication with structure 10 of one of the electrodes, preferably adjacent structure 10.

Figure 7:
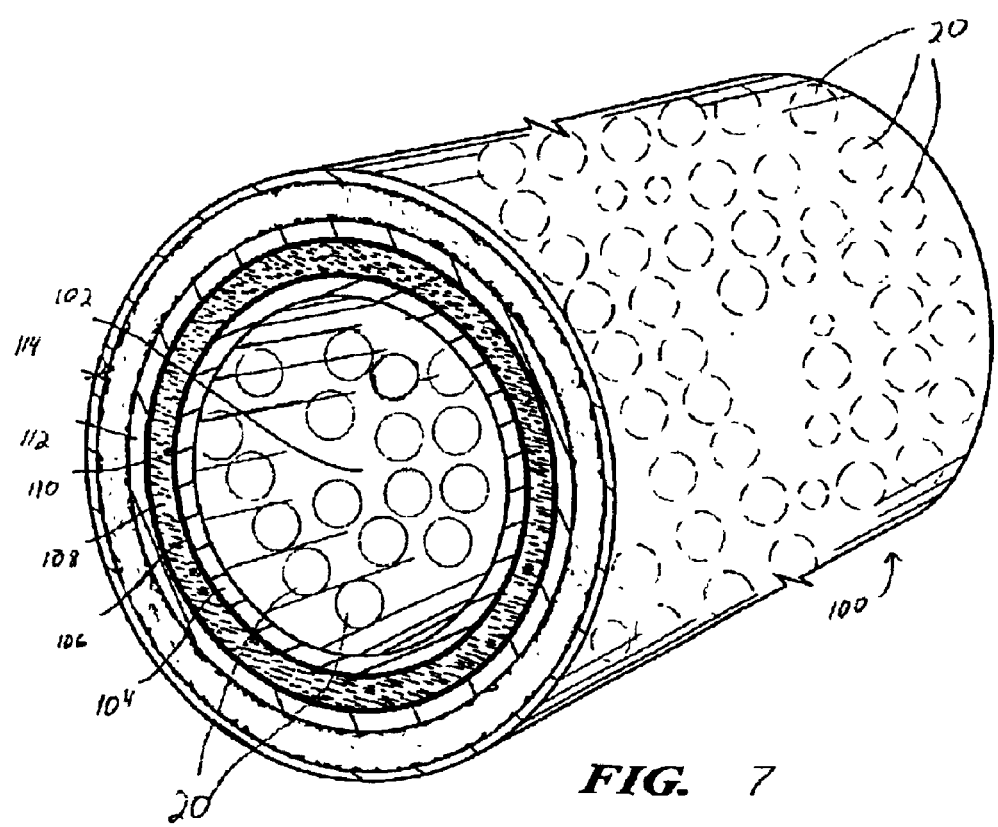
FIGS. 7 and 7(A) show a fluid permeable electrode assembly, which includes a transversely permeable article in accordance with the invention.
Figure 7A:
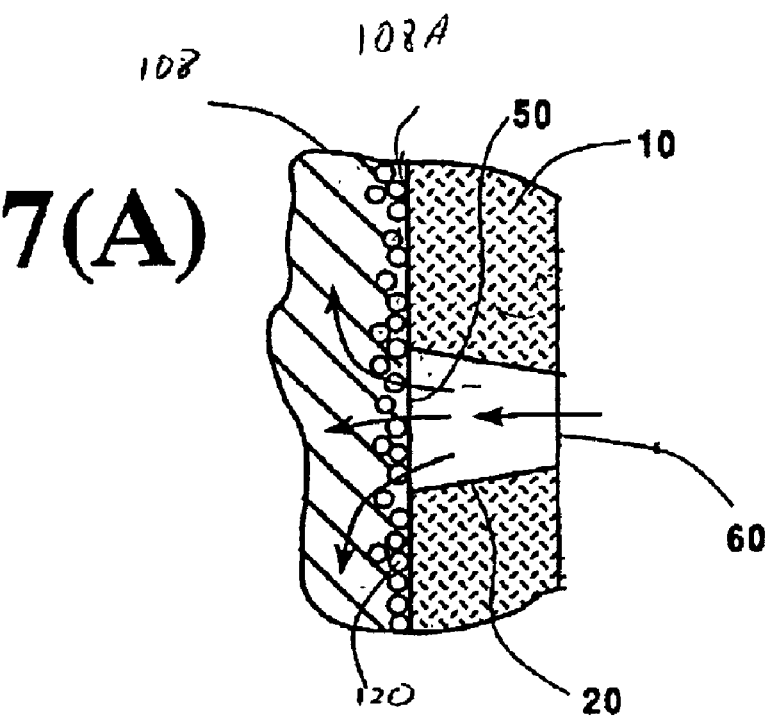

The gas permeable flexible graphite sheet 10 of FIG. 1 can be used as a fluid permeable structure in an electrochemical fuel cell 100 shown schematically in FIGS. 7 and 7(A), preferably cell 100 has a tubular (also referred to as cylindrical) shape.

Referring now to FIG. 7, a tubular fuel cell 100 has a central core 102 that has a certain geometrical cross-section. The cross-section can be circular, hexagonal, square, or any other desired geometric shape, although a preferred embodiment comprises circular. As used in the context of this disclosure, the terms "tubular", "cylindrical" or "cylinder" means a structure having a generally elongated shape having a long axis down the center of the shape, the shape having any of a number of cross sections such as circular, oval, elliptical, rectangular, pentagonal, hexagonal, etc. The central core 102 could also have a dynamically varying cross-sectional shape, resulting in a fuel cell of variable cross section. This may be desired for creating fuel cells that fit into a contoured package, for example a battery housing for a two-way radio. The central core 102 is depicted in FIG. 7 as a passage along the length of cell 100. Core 102 may serve as the distributing medium for one of the fuel or the oxidant. The fuel or oxidant, in either gas or liquid form, is introduced into core 102, preferably at one end, and is preferably distributed linearly throughout fuel cell 100 by means of the myriad interconnected pores. In a preferred embodiment, the fuel, e.g., hydrogen, is flown into cell 100 along core 102.

With respect to the fuel or the oxidant, the process for supplying the fuel or oxidant may be active or passive. An active oxidant supply system comprises a pumping element to supply the oxidant to cell 100. In comparison, a passive system does not use some type of pumping element to supply the oxidant to cell 100. Diffusion is one technique which a passive system may use to supply the oxidant to cell 100.

Figure 14:
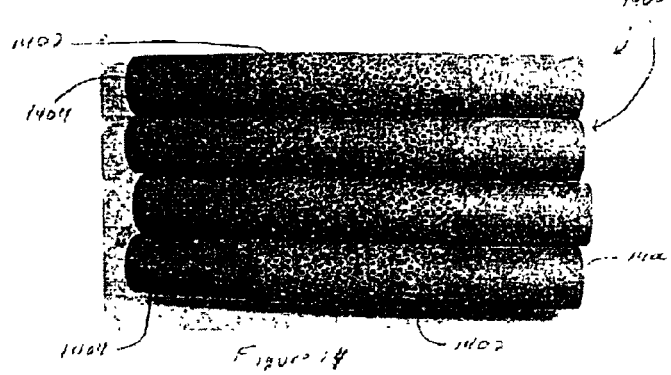
FIG. 14 is a perspective view of a plurality of graphite tubes, which can be used as the fluid permeable structure.

Preferably, a fluid permeable structure 104 overlies central core 102. Preferably, structure 104 includes a plurality of channels 20, (e.g., perforations). Structure 104 may include an electrically conductive foamed metal, structure 104 may also function as a current collector, thus eliminating the need for a separate current collector. Suitable structure materials are preferably at least those cited with respect to sheet 10. Alternatively, structure 104 may comprise a tube 1400 made of carbon or graphite, as shown in FIG. 14. As shown in FIG. 14, preferably tube 1400 comprises a perforated region 1402 and at least one unperforated region 1404. Preferably, characteristics for the structure 104 or 1400 include high electrical conductivity (at least as high as the electrical conductivity of aluminum) and high fluid permeability (at least about 1 $\mu l/cm^2$-s).

Preferably, a suitable catalyst 106 is disposed on an exterior surface of structure 104, such as platinum or alloys thereof, and any of the Group VIII metals or alloys containing Group VIII metals. An assembly of the structure 104 and catalyst 106 may comprise an electrode. In the case that the fluid in core 102 comprises a fuel, the combination of structure 104 and catalyst 106 would comprise an anode.

A preferred solid polymer electrolyte material 108 is illustrated in FIG. 7. The solid polymer electrolyte is preferably composed of an electrically insulating material that is substantially gas-impermeable and substantially ion-permeable. Suitable solid polymer electrolyte materials include films of perfluorinated sulfonic acids derived from fluorinated styrenes, quaternary amine polystyrene, polybenzimidazole (PBI), or other ionomeric polymers. NAFION® (trademark of E.I. DuPont de Nemours, Inc.) is a sulfonated polyfluoroaliphatic hydrogel capable of absorbing water and of withstanding the chemical environment of the cell. NAFION® has excellent mechanical strength, predictable dimensional changes, high electrical conductivity, and the ability to transport the desired ions while rejecting the undesired ions and molecules. Material 108 may also be referred to as a membrane, or a solid polymer ion exchange membrane.

Cell 100 further includes another layer of a catalyst material 110. Preferred materials for catalyst 110 may be chosen from the same group of materials as those of catalyst 106. Preferably, overlying catalyst 110 is the second fluid permeable structure 112, similar in construction to structure 104. Similarly to the assembly of structure 104 and catalyst 106, an assembly of structure 112 and catalyst 110 may comprise an electrode. Optionally, structure 112 may include a plurality of channels 20, shown in phantom. Optionally, oxidant chamber 114 is coaxially formed around the outside of the cathode assembly along the length of the cylinder 100 so that the oxidant can be evenly distributed to all surfaces of the cathode assembly by external wall 116.

A current transmission element (not shown in the drawing) separate from structure 104 may be used. The current transmission element may be formed on the outside of the anode or cathode, and is formed by any number of techniques, for example, using a wire mesh or an aluminum mesh. Preferably, the current transmission element is porous enough to allow the fuel to pass through it to the anode or the cathode. The current transmission element may also function as a mechanical strength element for cell 100.

One particular preferred embodiment of cell 100 includes a perforated graphite tube as structure 104. A carbon black layer is applied to an exterior surface of the graphite tube. Preferred cell 100 further comprises an MEA (catalyst-electrolyte-catalyst assembly) in contact with the carbon black layer. A second carbon black layer is coated on an exterior surface of the MEA.

Cell 100 further comprises an additional fluid permeable structure surrounding the second carbon layer. The additional structure may be either a porous graphite tube or a sheet of flexible graphite. Preferably, the flexible graphite sheet comprises about two layers of flexible graphite.

Lastly, a preferably porous or perforated, polymeric layer may be attached to an outer surface of the additional structure. Preferred polymers include, but are not limited to, polytetrafluoroethylene and polyethylene. The polytetrafluoroethylene layer may be heat shrinked around an exterior of the rest of cell 100 to inhibit relaxation of either one of the structures.

With respect to operation of cell 100, preferably structure 104 is able to receive a fluid traveling into or along core 102 and communicate the fluid to catalyst 106. Communicate is used here in to mean that the fluid may pass from structure 104 to catalyst 106 either directly or indirectly. Catalyst 106 may react the fluid and communicate the reaction product to electrolyte 108. The same is true for structure 112 and catalyst 110 regarding the fluid in chamber 114.

Figure 15:
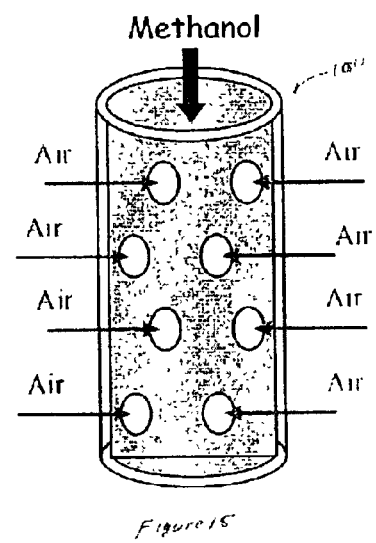
FIG. 15 is a plan view of one embodiment of the introduction of the fuel and the oxidant into a tubular fuel cell.

In one embodiment cell 100 is substantially devoid of an internal support element. Optionally, cell 100 may also be devoid of an external support element. In another embodiment, cell 100 consists of only electrolyte 108, the cathode assembly, and the anode assembly. With respect to the fuel and the oxidant, a preferred embodiment is depicted in FIG. 15 in which the fuel (methanol) is flown into a center of cell 100 and the oxidant (air) is flown into a cell 100 from an outer surface of cell 100.

Fuel cell 100 may also comprise a fluid distribution element as shown in FIGS. 10 and 11, generally designated 500 and 500'. FIGS. 10 and 11 are end views of two different fluid distribution elements 500 and 500'. Element 500 may be located in central core 102 of cell 100. A function of element 500 is to assist in distributing a fluid (e.g., hydrogen, air, hydrocarbon, alcohol, or oxygen) into one of channels 20 of the inner most structure (e.g., 104 of FIG. 7) of cell 100. As depicted in FIG. 10, element 500 comprises a solid, preferably having circular cross section, and tubular shaped in the lengthwise direction. Preferred materials of construction include metal, metal-alloy, polymer, carbon, or graphite. Element 500 of FIG. 10 includes a plurality of passages 502 on an outer surface of element 500. In operation, the fluid is charged along passages 502 of element 500 and then into the respective channels 20 of the electrode.

As for FIG. 11, element 500' comprises an axial passage 504 and, optionally, a plurality of radial passages, not shown in FIG. 11. In a preferred embodiment of element 500', fluid is charged into an axial passage 504 and then into the plurality of radial passages to the plurality of passages 502. Just as in FIG. 10, the fluid passes from passages 502 into perforations 20. Another embodiment of a fluid fuel cell distribution element comprises a perforated carbon or graphite tube. The tube may have at least one unperforated region. The fluid enters the tube through a central common passage and into structure 100 through the plurality of perforations.

Depicted in FIG. 7(A), is in an alternate embodiment of fuel cell 100, the catalyst either 106, 110 or both is coated onto electrolyte 108, preferably in the form of a plastic e.g., a solid polymer ion exchange membrane, surfaces 108A (alternatively both surfaces) of electrolyte 108 instead of on a surface of structure 104 or 112. The assembly of electrolyte 108 and catalysts 106 and 110 may be referred to as a membrane electrode assembly ("MEA"). In this embodiment, platinum 120 is a preferred embodiment of the catalyst. In this embodiment, preferably structure 10 comprises at least one perforated flexible graphite sheet.

FIG. 7 and FIG. 7(A) show, schematically, the basic elements of an electrochemical fuel cell, more complete details of which are disclosed in U.S. Pat. Nos. 4,988,583 and 5,300,370 and PCT WO 95/16287 (Jun. 15, 1995) and each of which is incorporated herein by reference.

In operation a, fuel (such as hydrogen) is charged through channels 20 of structure 104 and an oxidant (e.g., oxygen) is circulated through channels 20 of structure 112. The fuel reacts on the surface of catalyst 106 to form a proton and electron. The proton comes in contact with electrolyte 108 and is passed through electrolyte 108. The electron generated from the reaction forming the proton is removed from fuel cell 100 along the anode assembly and may be used as energy.

Furthermore, in the operation of fuel cell 100, it is preferred that the structures 104 and 112 (preferably composed of two or more sheets 10) are porous to the fuel and oxidant fluids, e.g., hydrogen and oxygen, to permit these fluids to readily pass through structure 104 or 112, respectively, to contact catalyst 110 or 106, respectively, as shown in FIG. 7. Protons, derived from the reaction of the hydrogen, migrate through ion exchange membrane 108. In structure 10 of the invention, preferably, channels 20 are positioned so that the fluid (fuel, oxidant, or both) enters structure 10 through smaller openings 60 of channels 20 and exits the larger openings 50 of channels 20. The initial velocity of the fluid at the smaller openings 60 is higher than the velocity of the fluid at the larger openings 50 with the result that the fluid is slowed down when it contacts the catalyst 110 or 106 and also the residence time of the fluid-catalyst contact is increased resulting in maximizing the area of membrane 108 exposed to the fluid. This feature, together with the increased electrical conductivity of the flexible graphite electrode of the present invention enables more efficient fuel cell operation.

Figure 8:
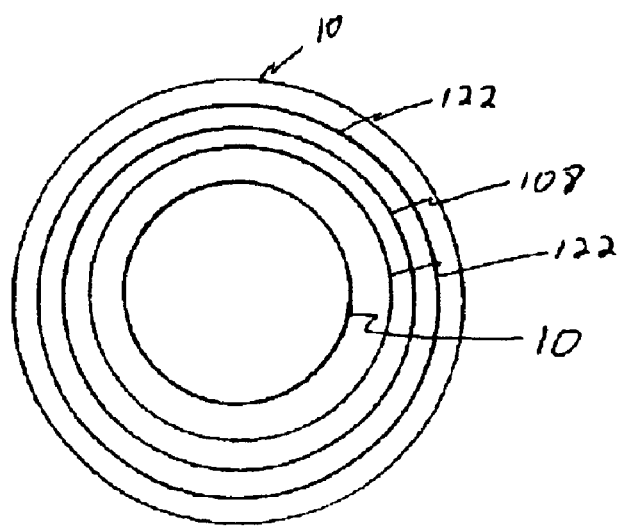
FIG. 8 is an exploded schematic end view of an assembly of a structure-gas diffusion layer-electrolyte-gas diffusion layer-structure in which the electrodes do not overlap onto themselves respectively.

One embodiment of a method of making fuel cell 100 includes rolling structure 10 into a tubular shape. Optionally, structure 10 may have portions that overlap one another or it may not, as shown in FIGS. 8 (non-overlapping) and 9 (overlapping). Structure 10 may be rolled by hand or rolling step may be automated. Next, preferably a MEA 124 of catalyst 106, electrolyte 108, and catalyst 110, are applied to an outer surface of tubular shaped structure 10. MEA 124 may be rolled around structure 10. It is preferred that electrolyte 108 of MEA 124 does not overlap onto itself.

Figure 9:
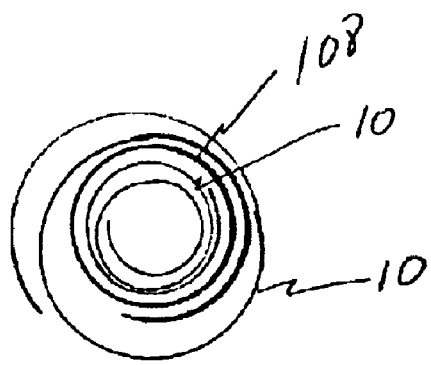
FIG. 9 is an exploded schematic end view of an assembly of an electrode-electrolyte-electrode in which the electrodes do overlap onto themselves respectively.

As shown in FIG. 8, in another alternate embodiment, a gas diffusion layer 122 is between structure 10 and MEA 124. Preferably, gas diffusion layer 122 is rolled onto the outer surface of structure 10 prior to MEA 124 being applied to the outer surface. Optionally, as shown in FIGS. 8 and 9, a second structure 10 may be rolled onto to the assembly of structure 10 and MEA 124. Second structure 10 may be rolled by hand or the rolling step may be automated.

In a second embodiment, a roll-able planar membrane gas diffusion layer assembly is formed by laminating the membrane and the layer together. In the same manner as stated above, the assembly is rolled onto tubular shaped structure 10. Preferably, the laminating force comprises a compressive force of at least about 50 psi. A preferred range of the force is about 50 psi to about 5000 psi. The temperature of the laminating step preferably comprises at least about 50° C., more preferably up to at least about 150° C. Other aspects of making cell 100 are the same as discussed in the above paragraph.

In the case that a sheet 10, which makes-up either one of structures 104 or 112, comprises more than one layer of flexible graphite, sheet 10 may be formed by pressing multiple layers of flexible graphite together. A compressive force of about 50 to about 5000 psi may be used to press the sheets together. For additional techniques and guidance on how to form fuel cell 100, the specification of U.S. Pat. No. 6,001,500 is hereby incorporated herein by reference.

Additionally, the article of the present invention can be used as electrical and thermal coupling elements for integrated circuits in computer applications, as conformal electrical contact pads and as electrically energized grids in de-icing equipment.

The above description is intended to enable the person skilled in the art to practice the invention. It is not intended to detail all of the possible variations and modifications, which will become apparent to the skilled worker upon reading the description. It is intended, however, that all such modifications and variations be included within the scope of the invention, which is defined, by the following claims and the equivalents of the claims. The claims are intended to cover the indicated elements and steps in any arrangement or sequence which is effective to meet the above advantages intended for the invention, unless the context specifically indicates the contrary.

What is claimed is:

1. A method of making a fuel cell comprising:
   forming a fluid permeable structure by the steps comprising intercalating an acidic material into a plurality of natural graphite flakes and exfoliating the intercalated graphite flakes;
   perforating at least a portion of the fluid permeable structure;
   laminating a catalyst layer and an electrolyte to said structure to form an assembly; and
   rolling said assembly into a tubular shape.

2. The method according to claim 1 wherein said perforating comprises forming at least one opening in said structure having a taper from a first opening to a second opening.

3. The method of claim 1 comprising further compressing said exfoliated graphite flakes into a plurality of sub-sheets and compressing said sub-sheets into said sheet.

4. The method of claim 1 further comprising applying a coating to a surface of said structure, wherein said surface contacts said catalyst and said coating comprises at least one from carbon, graphite, polytetrafluoroethylene, hydrophobic surfactant, polyvinyldifluoride, and combinations thereof.

5. The method according to claim 1 further comprising rolling a second fluid permeable structure onto said assembly.

6. The method according to claim 1 further comprising impregnating said structure with a polymer.

7. The method according to claim 1 wherein said perforating comprises mechanically impacting an opposed surface of said structure to displace a material of construction of said structure at a plurality of predetermined locations.

8. The method according to claim 1 further comprising applying a coating of a polymeric material to an exterior surface of said cell and shrinking said coating.

9. A method of making a fuel cell comprising:
   perforating at least a portion of a fluid permeable structure by mechanically impacting an opposed surface of said structure to displace a material of construction of said structure at a plurality of predetermined locations;
   rolling said perforated structure into a tubular shape; and
   applying a catalyst layer and an electrolyte around said tubular structure, such that said structure communicates with said catalyst and said catalyst communicates with said electrolyte.

10. The method according to claim 9 wherein said catalyst further comprises a carbon coating facing said structure.

11. The method according to claim 9 wherein said applying comprises depositing said electrolyte around a circumference of said structure.

12. The method of making according to claim 9 wherein said applying comprises rolling said electrolyte around a circumference of said structure.

13. The method according to claim 9 further comprising rolling a second fluid permeable structure around an outer surface of said electrolyte.

14. The method according to claim 9 further comprising impregnating said structure with a polymer.

15. The method according to claim 9 further comprising applying a coating of polymeric material to an exterior surface of said cell and shrinking said coating.

16. A method of making a fuel cell comprising
   applying a catalyst layer around a perforated region of a graphite tube; and
   positioning an electrolyte in communication with said catalyst layer.

17. The method according to claim 16 further comprising positioning a second catalyst layer in communication with said electrolyte and rolling a perforated sheet of flexible graphite around said second catalyst, such that fluid may pass through said sheet of flexible graphite and contact said second catalyst.

18. The method according to claim 17 further comprising applying a fluid permeable polymeric layer around an exterior of said sheet of flexible graphite.

* * * * *